(12) United States Patent
Kim

(10) Patent No.: US 9,188,816 B2
(45) Date of Patent: Nov. 17, 2015

(54) COLOR FILTER SUBSTRATE, LIQUID CRYSTAL PANEL AND LIQUID CRYSTAL DISPLAY DEVICE

(71) Applicant: BOE Technology Group Co., Ltd., Beijing (CN)

(72) Inventor: Heecheol Kim, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 13/960,290

(22) Filed: Aug. 6, 2013

(65) Prior Publication Data

US 2014/0043570 A1    Feb. 13, 2014

(30) Foreign Application Priority Data

Aug. 10, 2012   (CN) .......................... 2012 1 0285759

(51) Int. Cl.
| G02F 1/1343 | (2006.01) |
| G02F 1/1335 | (2006.01) |
| G02B 5/22 | (2006.01) |
| G02B 27/22 | (2006.01) |

(52) U.S. Cl.
CPC ............ *G02F 1/134309* (2013.01); *G02B 5/22* (2013.01); *G02F 1/133514* (2013.01); *G02F 1/134363* (2013.01); *G02B 27/2214* (2013.01); *G02F 2001/134318* (2013.01); *G02F 2201/121* (2013.01); *G02F 2201/122* (2013.01); *G02F 2201/123* (2013.01)

(58) Field of Classification Search
CPC ..................... G02F 1/134309; G02F 1/133514; G02F 1/134363; G02F 2201/122; G02F 2201/123; G02F 2201/121; G02F 2001/134318; G02B 5/22; G02B 27/2214
See application file for complete search history.

(56) References Cited

U.S. PATENT DOCUMENTS

| 2004/0263749 A1* | 12/2004 | Jeong et al. ................... 349/141 |
| 2007/0085958 A1* | 4/2007 | Lin et al. ....................... 349/141 |
| 2008/0129901 A1 | 6/2008 | You et al. |
| 2011/0075074 A1* | 3/2011 | Gauza et al. .................... 349/96 |
| 2012/0162592 A1* | 6/2012 | Takagi ............... G02B 27/2214 349/139 |
| 2012/0327350 A1* | 12/2012 | Chang et al. .................. 349/139 |

FOREIGN PATENT DOCUMENTS

| CN | 101718928 A | 6/2010 |
| CN | 101943829 A | 1/2011 |
| CN | 202710887 U | 1/2013 |

(Continued)

OTHER PUBLICATIONS

Second Office Action issued by the State Intellectual Property Office of the People's Republic of China for Chinese Patent Application No. 201210285759X, dated Jul. 15, 2014, 5pgs.

(Continued)

*Primary Examiner* — Dennis Y Kim

(57) ABSTRACT

Embodiments of the invention provide a color filter substrate, a liquid crystal panel and a liquid crystal display device. The color filter substrate comprising a substrate; a plurality of sets of electrode structure formed on a side of the substrate, each set of electrode structure comprises a pixel electrode and a common electrode for generating a horizontal electric field between the pixel electrode and the common electrode by applying a voltage.

7 Claims, 2 Drawing Sheets

(56) References Cited

FOREIGN PATENT DOCUMENTS

| JP | 09-185038 | 7/1997 |
| WO | WO 2013038557 A1 * | 3/2013 |

OTHER PUBLICATIONS

English translation of Second Office Action issued by the State Intellectual Property Office of the People's Republic of China for Chinese Patent Application No. 201210285759X, dated Jul. 15, 2014, 2pgs.

Office Action issued by the Korean Patent Office for Korean Patent Application No. 10-2013-0094620, dated Jul. 30, 2014, 6pgs.

English translation of Office Action issued by the Korean Patent Office for Korean Patent Application No. 10-2013-0094620, dated Jul. 30, 2014, 3pgs.

Partial European Search Report for European Patent Application No. EP 13 17 9341 dated Jan. 27, 2014, 7pgs.

First Chinese Office Action for Chinese Patent Application No. 20120285759.X dated Jan. 13, 2014, 7pgs.

English translation of First Chinese Office Action for Chinese Patent Application No. 20120285759.X, 4 pgs.

English abstract of CN101718928A, listed above, 1 page.

Extended European search report issued by the European Patent Office on Dec. 17, 2014 for International Application No. 14182241.1, 7 pages.

Communication pursuant to Article 94(3) EPC issued by the European Patent Office on Apr. 28, 2015 for Application No. 13 179 341.6, 5 pages.

Office Action (Korean language) issued by the Korean Intellectual Property Office ("KIPO") on Apr. 10, 2015 for Application No. 10-2013-0094620, 3 pages.

English translation of Office Action (listed above) issued by KIPO on Apr. 10, 2015 for Application No. 10-2013-0094620, 2 pages.

* cited by examiner

COLOR FILTER SUBSTRATE, LIQUID CRYSTAL PANEL AND LIQUID CRYSTAL DISPLAY DEVICE

CROSS REFERENCE TO RELATED APPLICATIONS

This application claims priority from Chinese National Application No. 201210285759.X filed on Aug. 10, 2012, the contents of which are incorporated herein by reference.

FIELD OF THE ART

Embodiments of the invention relate to the field of liquid crystal display, more specifically, to a color filter substrate, a liquid crystal panel and a liquid crystal display (LCD) device.

BACKGROUND

LCD devices are categorized into vertical electric field (E-field) LCD devices and horizontal E-field LCD devices, based on the direction of the E-field driving the liquid crystals. The vertical E-field LCD devices generally include Twist Nematic (TN) mode and vertical alignment (VA) mode, while the horizontal E-field LCD devices generally include in-plane switching (IPS) mode, fringe field switching (FFS) mode and advanced super dimension switching (ADS) mode. In comparison with the vertical E-field LCD devices, the horizontal E-field LCD devices do not require additional optical compensation films to realize wide view angle. However, the distribution of the E-field in the liquid crystal layer of the horizontal E-field LCD device is not uniform and there are local regions not covered by the E-field and therefore non-transmissive for the light, which makes the overall light transmissivity of the liquid crystal panel low.

SUMMARY

The present invention aims to provide a color filter substrate, a liquid crystal panel and a liquid crystal display device so as to increase light transmissivity of the liquid crystal panel.

To meet the above purpose, the invention provides the following technical solutions.

A first aspect of the invention provides a color filter substrate comprising:
a substrate;
a plurality of sets of electrode structure formed on a side of the substrate, each set of electrode structure comprises a pixel electrode and a common electrode for generating a horizontal electric field between the pixel electrode and the common electrode by applying a voltage.

In the above color filter substrate, in any two neighboring sets of electrode structure, the pixel electrode and the common electrode are disposed in opposite order.

In the above color filter substrate, in any two neighboring sets of electrode structure, the distance between the pixel electrode and the common electrode is the same.

In the above color filter substrate, each of the pixel electrode and the common electrode has a width of 2~3 μm;
the distance between the pixel electrode and the common electrode is 2~5 μm.

A second aspect of the invention provides a liquid crystal panel comprising an array substrate, a color filter substrate, and a liquid crystal layer formed between the array substrate and the color filter substrate, wherein:

a plurality of first pixel electrodes and a plurality of first common electrodes are alternatively disposed on a side of the array substrate facing the color filter substrate;
a plurality of sets of electrode structure are formed on a side of the color filter substrate facing the array substrate, each set of electrode structure comprises a second pixel electrode and a second common electrode, the second pixel electrode and the second common electrode in each set of electrode structure are symmetrically distributed on both sides of an orthographic projection of the first pixel electrode or the first common electrode on the color filter substrate.

In the above liquid crystal panel, in any two neighboring sets of electrode structure on the color filter substrate, the second pixel electrode and the second common electrode are disposed in opposite order.

In the above liquid crystal panel, a distance between the second pixel electrode and the neighboring second common electrode of the electrode structure is smaller than a distance between the first pixel electrode and the neighboring first common electrode.

In the above liquid crystal panel, the first pixel electrode, each of the second pixel electrode, the first common electrode and the second common electrode has a width of 2~3 μm;
the distance between the second pixel electrode and the neighboring second common electrode of the electrode structure is 2~5 μm;
the distance between the first pixel electrode and the neighboring first common electrode is 5~10 μm.

A third aspect of the invention provides a liquid crystal display device comprising the above liquid crystal panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 3:
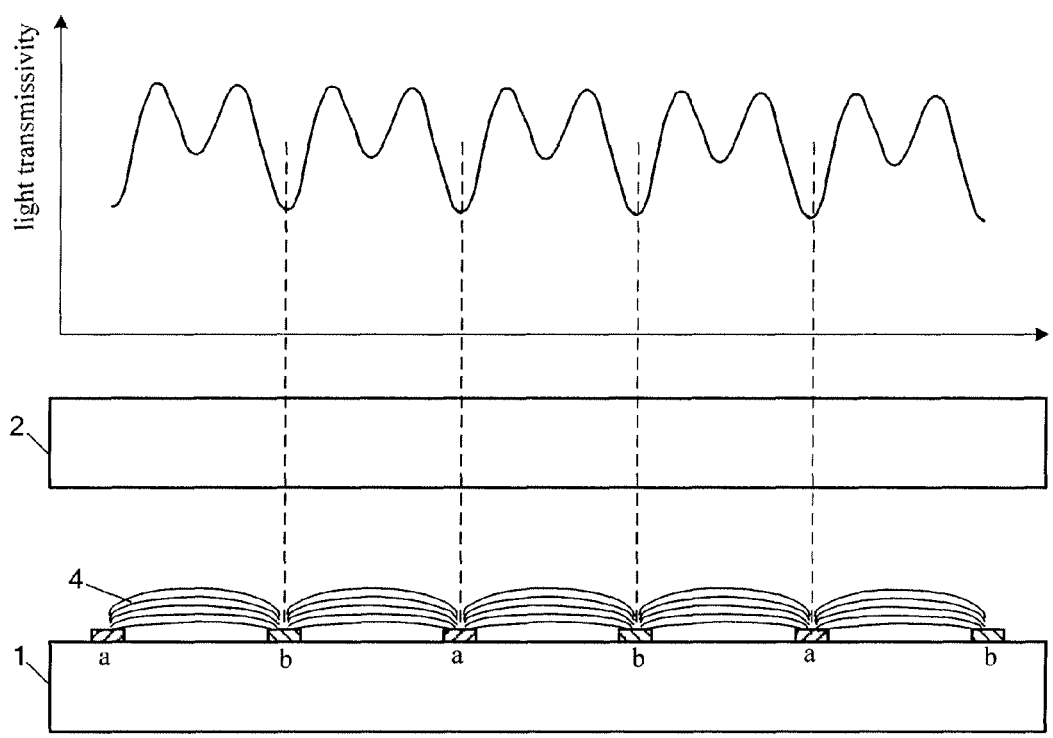
FIG. 3 schematically illustrates a light transmissivity distribution of the conventional liquid crystal panel.

With reference to FIG. 3, a configuration of a conventional horizontal electric field (E-field) liquid crystal panel has a pixel electrode a and a common electrode b formed on an array substrate 1 and no electrode is formed on a color filter substrate 2. It is seen from FIG. 3 that a horizontal E-field 4 is formed between the pixel electrode a and the common electrode b when a voltage is applied, while no E-field is formed in regions direct over the pixel electrode a and the common electrode b. As a result, liquid crystal molecules in the regions are not rotated and no phase delay is generated when light passes through the regions. Under the effect of the upper and lower polarizers of the liquid crystal panel, light in these regions can not transmit through the liquid crystal panel, which makes the overall light transmissivity of the liquid crystal panel low. Generally, the liquid crystal panel having such a configuration has a maximum light transmissivity of about 70%.

To solve the above problem, an embodiment of the invention provides a liquid crystal panel, which further has a pixel electrode and a common electrode formed on the color filter substrate other than the pixel electrode and the common electrode formed on the array substrate. The liquid crystal layer not only has a primary E-field generated by the pixel and common electrodes on the array substrate but also an auxiliary E-field generated by the pixel and common electrodes on the color filter substrate. The auxiliary E-field compensates and enhances the horizontal E-field in the liquid crystal layer, thereby forming a uniform E-field distribution in the liquid crystal layer. A liquid crystal panel with such a configuration has a minimum light transmissivity of over 70% and a maximum light transmissivity of up to 90%.

Figure 1:
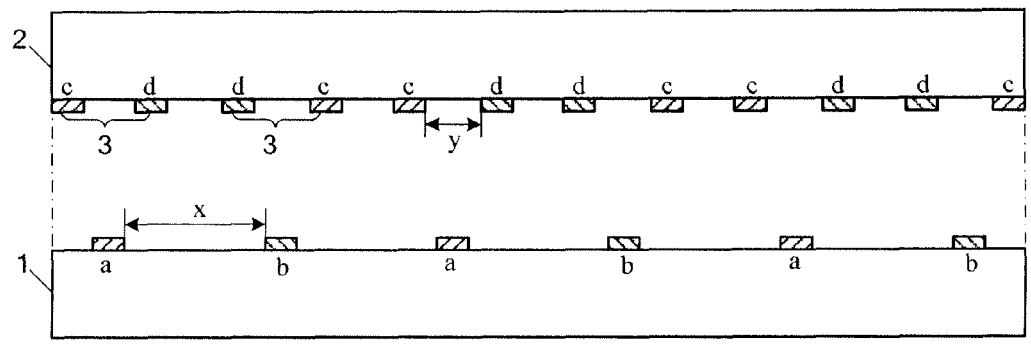
FIG. 1 schematically illustrates a configuration of a liquid crystal panel in accordance with an embodiment of the invention.

With reference to FIG. 1, a liquid crystal panel in accordance with the embodiment of the invention comprises an array substrate 1, a color filter substrate 2 and a liquid crystal layer (not shown) formed between the array substrate 1 and the color filter substrate 2, in which:

a plurality of first pixel electrodes "a" and a plurality of first common electrodes "b" are alternatively disposed on a side of the array substrate 1 facing the color filter substrate 2;

a plurality of sets of electrode structure 3 are formed on a side of the color filter substrate 2 facing the array substrate 1, each set of electrode structure 3 comprises a second pixel electrode "c" and a second common electrode "d", the second pixel electrode c and the second common electrode d in each set of electrode structure 3 are symmetrically disposed on both sides of an orthographic projection of the first pixel electrode a or the first common electrode b on the color filter substrate 2.

Preferably, in the above liquid crystal panel, the second pixel electrode c and the second common electrode d of two neighboring sets of electrode structure 3 are disposed in opposite order. As an example, in a first set of electrode structure 3, the second pixel electrode c is disposed on the left side of the second common electrode d, while in a second (i.e., neighboring) set of electrode structure 3, the second pixel electrode c is disposed on the right side of the second common electrode d. By this means, the auxiliary E-field is distributed only in the regions direct over the first pixel electrode a and the first common electrode b.

Preferably, a distance y between the second pixel electrode c and the neighboring second common electrode d of the electrode structure 3 is smaller than a distance x between the first pixel electrode a and a neighboring first common electrode b.

As an example, each of the first pixel electrode a, the second pixel electrode c, the first common electrode h and the second common electrode d has a width of 2~3 µm, the distance between the second pixel electrode c and the neighboring second common electrode d of the electrode structure 3 is 2~5 µm, and the distance between the first pixel electrode a and the neighboring first common electrode b is 5~10 µm. The auxiliary E-field generated by the second pixel electrode c and the second common electrode d on the color filter substrate is located right above the first pixel electrode or the first common electrode on the array substrate and may enhance the primary horizontal E-field on the array substrate. Here, a voltage for the first and second common electrodes a and c may be constant, while a voltage for the first and second pixel electrodes b and d may be adjusted based on the displayed gray level value, for example, it may be 0~20V.

Figure 2:
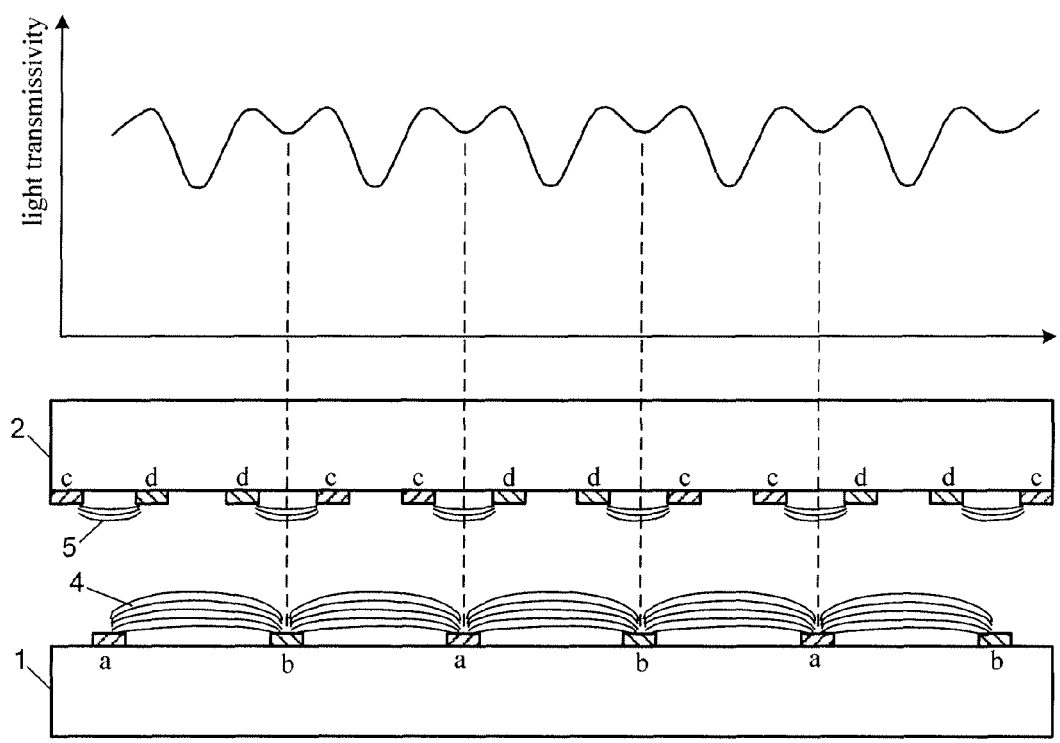
FIG. 2 schematically illustrates a light transmissivity distribution of the liquid crystal panel in accordance with the embodiment of the invention when electric field is formed therein.

With reference to FIG. 2, in the afore-mentioned liquid crystal panel in accordance with the embodiment of the invention, when display is required, voltages are applied to the first pixel electrode a, the first common electrode b, the second pixel electrode c and the second common electrode d, a primary horizontal E-field 4 is formed between the first pixel electrode a and the first common electrode b, an auxiliary horizontal E-field 5 is formed between the second pixel electrode c and the second common electrode d, and the auxiliary horizontal E-field 5 is in the regions direct over the first pixel electrode a and the first common electrode b. In such a way, a uniform E-field distribution is formed in the liquid crystal layer. The uniform E-field may substantially rotate all the liquid crystal molecules in the pixel region, thereby, phase delay of the light transmitted through the liquid crystal layer is increased and the light transmissivity of the liquid crystal panel is accordingly increased.

The advantages effect of the embodiment of the invention may be seen by comparing FIGS. 2 and 3. It is seen from FIG. 3 that no E-field exists direct over the first pixel electrode a and the first common electrode b, which makes the light transmissivity low, while the auxiliary horizontal E-field 5 is formed right above the first pixel electrode a and the first common electrode in FIG. 2, thereby increasing the light transmissivity.

Moreover, an embodiment of the invention provides a display device which comprises the liquid crystal panel of the above embodiment. The display device may be a liquid crystal panel, an E-paper, a liquid crystal television, a liquid crystal display, a digital photo-frame, a mobile phone, a tablet PC and any other product or device having a display function.

What are described above is related to the illustrative embodiments of the disclosure only and not limitative to the scope of the disclosure; the scopes of the disclosure are defined by the accompanying claims.

What is claimed is:
1. A color filter substrate for a liquid crystal panel, the liquid crystal panel comprising:

an array substrate, wherein a plurality of first pixel electrodes and a plurality of first common electrodes are alternatively disposed on a side of the array substrate facing the color filter substrate; and a plurality of sets of electrode structures formed on a side of the color filter substrate, each set of electrode structure being separate from one another and comprising a second pixel electrode and a second common electrode for generating a horizontal electric field between the second pixel electrode and the second common electrode by applying a voltage, in any two neighboring sets of electrode structure, the second pixel electrode and the second common electrode are disposed in opposite order, and each of the electrodes in one of the two neighboring sets of electrode structure not being shared with another set of electrode structure;

wherein a distance between the second pixel electrode and the neighboring second common electrode of the electrode structure is smaller than a distance between the first pixel electrode and the neighboring first common electrode.

2. The color filter substrate of claim 1, wherein: in any two neighboring sets of electrode structure, the distance between the second pixel electrode and the second common electrode is the same.

3. The color filter substrate of claim 2, wherein: each of the second pixel electrode and the second common electrode has a width of 2~3 μm; the distance between the second pixel electrode and the neighboring second common electrode is 2~5 μm.

4. The color filter substrate of claim 1, wherein: each of the second pixel electrode and the second common electrode has a width of 2~3 μm; the distance between the second pixel electrode and the neighboring second common electrode is 2~5 μm.

5. A liquid crystal panel comprising an array substrate, a color filter substrate, and a liquid crystal layer formed between the array substrate and the color filter substrate, wherein:

a plurality of first pixel electrodes and a plurality of first common electrodes are alternatively disposed on a side of the array substrate facing the color filter substrate;

a plurality of sets of electrode structures are formed on a side of the color filter substrate facing the array substrate, each set of electrode structure being separate from one another and comprising a second pixel electrode and a second common electrode, the second pixel electrode and the second common electrode in each set of electrode structure are symmetrically distributed on both sides of an orthographic projection of the first pixel electrode or the first common electrode on the color filter substrate, and wherein in any two neighboring sets of electrode structure, the pixel electrode and the common electrode are disposed in opposite order, and each of the electrodes in one of the two neighboring sets of electrode structure not being shared with another set of electrode structure;

wherein a distance between the second pixel electrode and the neighboring second common electrode of the electrode structure is smaller than a distance between the first pixel electrode and the neighboring first common electrode.

6. The liquid crystal panel of claim 5, wherein: each of the first pixel electrode, the second pixel electrode, the first common electrode and the second common electrode has a width of 2~3 μm; the distance between the second pixel electrode and the neighboring second common electrode of the electrode structure is 2~5 μm; the distance between the first pixel electrode and the neighboring first common electrode is 5~10 μm.

7. A liquid crystal display device comprising the liquid crystal panel of claim 5.

* * * * *